United States Patent [19]
Brown

[11] Patent Number: 5,932,052
[45] Date of Patent: Aug. 3, 1999

[54] PROCESS FOR APPLYING INDICIA ONTO AN ELASTOMERIC COMPONENT

[76] Inventor: Russell S Brown, 1673 Kaiakaua Ave., Honolulu, Hi. 98826

[21] Appl. No.: 08/797,869

[22] Filed: Feb. 10, 1997

[51] Int. Cl.⁶ .......................... B32B 31/12; B32B 31/20; B44C 1/14
[52] U.S. Cl. .......................... 156/235; 156/116; 156/233; 156/234; 156/241; 156/281
[58] Field of Search .................... 156/233, 234, 156/235, 239, 241, 281, 116

[56] References Cited

U.S. PATENT DOCUMENTS

| | | |
|---|---|---|
| 4,256,159 | 3/1981 | Williams .............................. 156/116 X |
| 4,684,420 | 8/1987 | Bryant et al. ........................... 156/116 |
| 5,047,110 | 9/1991 | Bryant et al. ....................... 156/230 X |
| 5,315,764 | 5/1994 | Robbins .............................. 156/116 X |
| 5,364,688 | 11/1994 | Mahn, Jr. . |
| 5,380,391 | 1/1995 | Mahn, Jr. . |
| 5,437,755 | 8/1995 | Lavorel et al. . |
| 5,508,248 | 4/1996 | Nagashima . |
| 5,603,796 | 2/1997 | Baker ................................... 156/272.8 |

*Primary Examiner*—Curtis Mayes
*Attorney, Agent, or Firm*—Michael I. Kroll

[57] ABSTRACT

A process for applying indicia onto an elastomeric component that will transfer by heat a coating of metallic foil onto raised surfaces on the elastomeric component, which can be letters on a motor vehicle tire. The process will also transfer by heat, a design of colored metallic foil onto a surface of the elastomeric component.

4 Claims, 16 Drawing Sheets

┌─ 68

PREPARE SURFACES FOR APPLICATION OF THE SUPPLIED PRIMARY ADHESIVE BY CLEANING WITH A DEGREASER AND OR SOLVENT.
52

APPLY A THIN COAT OF THE PRIMARY ADHESIVE, USING THE SUPPLIED APPLICATOR, TO THE RAISED SURFACES WHERE FOIL IS TO BE ATTACHED.
(FIG 1)
54

LET THE PRIMARY ADHESIVE CURE.
56

THE FOIL IS A COMPOSITION OF A THIN METALLIC FOIL CONTAINED BETWEEN AN OUTER MYLAR LAYER AND AN OUTER ADHESIVE LAYER.
(FIG 9)
58

USING AN IRON SET ON LOW HEAT 150° - 200°, PRESS ON THE FOIL'S MYLAR SURFACE UNTIL THE LETTERS ARE VISIBLE IN THE FOIL LAYER. THIS IS AN INDICATOR THAT THE FOIL'S ADHESIVE LAYER HAS BONDED WITH THE PRIMARY ADHESIVE SURFACE.
(FIG 3)
60

REMOVE THE IRON AND LET THE APPLIED FOIL COOL FOR 10 - 20 SECONDS.
62

GRASP THE APPLIED FOIL BY AN UNATTACHED CORNER AND GENTLY PEEL OFF FROM THE TIRE.
(FIG 4)

<u>64</u>

TO APPLY ADDITIONAL LAYERS OF FOIL:
1. REPEAT PROCESS OF COATING LETTERS WITH ADHESIVE AND THEN HEAT PRESS ON FOIL.
OR
2. COAT BACK OF FOIL WITH ADHESIVE, LET DRY AND THEN HEAT PRESS ON FOIL.

| TO APPLY A DESIGN, THE USER SUPPLIES THE DESIGN. |
| (FIG 5)  70 |

| THE DESIGN CAN BE OF ANY NAME, PHOTOGRAPH, PICTURE, AND DRAWING WHICH CAN BE REPRODUCED ONTO PLAIN WHITE PAPER. |
| (FIG 5)  72 |

| THE USER TAKES THE DESIGN CONTAINED ON THE PLAIN WHITE PAPER TO A PRINT SHOP OR OFFICE SUPPLY STORE OR ANY BUSINESS WHERE THEY CAN PRODUCE A BLACK AND WHITE XEROGRAPHIC COPY OF THE DESIGN AND HAS ONE MADE TO THE REQUIRED SIZE. |
| (FIG 6)  74 |

| PLACE, ON A SUITABLE WORK SPACE, SOME OLD NEWSPAPERS OR ANY MATERIALS WHICH WILL PROVIDE A FLAT STABLE SURFACE AND BE UNAFFECTED BY A LOW TEMPERATURE IRON. |
| 76 |

| PLACE THE SUPPLIED ACETATE SHEET ON THE WORK SPACE. |
| (FIG 7)  78 |

| PLACE THE INVERSE DESIGN ON TOP OF THE ACETATE SHEET. |
| (FIG 7)  80 |

| PLACE THE SELECTED COLOR FOIL WITH THE SHINY SIDE UP ON TOP OF THE INVERSE DESIGN. |
| (FIG 7)  82 |

| USING AN IRON, SET ON LOW HEAT, 150° - 200°F. PLACE THE IRON ON TOP OF THE FOIL AND PASS OVER THE ENTIRE DESIGN IN A SMOOTH AND CONSISTENT MANNER. THIS SHOULD TAKE APPROXIMATELY 15 - 30 SECONDS DEPENDING ON THE COMPLEXITY AND AMOUNT OF DETAIL CONTAINED ON THE INVERSE DESIGN. (FIG 8) 84 |

| A FINE DETAIL DESIGN WOULD REQUIRE THE LONGER TIME PERIOD TO ENSURE PROPER BONDING BETWEEN THE INK OF THE DESIGN AND THE ADHESIVE OF THE FOIL. 86 |

| USING THE ACETATE SHEET AS AN UNDERLAYMENT ALLOWS EASIER, BETTER BONDING OF FOIL TO THE XEROGRAPHIC TONER INK. THE ACETATE ACTS AS A HEAT REFLECTOR FOR CONSISTENT EVEN HEAT ON THE DESIGN (FIG 9) 88 |

| THE FOIL IS A COMPOSITION OF A THIN METALLIC FOIL CONTAINED BETWEEN AN OUTER MYLAR LAYER AND AN OUTER ADHESIVE LAYER. (FIG 9) 90 |

| WITH THE APPLICATION OF HEAT, THE ADHESIVE OF THE FOIL WILL BOND TO THE XEROGRAPHIC TONER INK OF THE DESIGN. THE FOIL WILL NOT BOND TO PAPER, ONLY THE XEROGRAPHIC TONER INKED AREAS OF THE PAPER. (FIG 9) 92 |

| THE RESULTS OF THIS PROCESS IS THAT THE ADHESIVE AND FOIL, STILL ATTACHED TO THE MYLAR, IS AN EXACT COPY OF THE DESIGN WHICH WAS USED TO MAKE THE BLACK AND WHITE INVERSE IMAGE OF THE DESIGN. (FIG 10) 94 |

FIG 18

```
                    ┌68
                    ↓
┌─────────────────────────────────────────────┐
│   LET THE FOIL COOL FOR 5 TO 10 SECONDS.    │
│                                          96 │
└─────────────────────────────────────────────┘
                    │
┌─────────────────────────────────────────────┐
│  GRASP THE FOIL AND PEEL OFF FROM THE PAPER │
│       CONTAINING THE INVERSE DESIGN.        │
│              (FIG 10)                    98 │
└─────────────────────────────────────────────┘
                    │
┌─────────────────────────────────────────────┐
│  TURN OVER THE MYLAR, WITH THE ATTACHED FOIL│
│   DESIGN, SO THAT THE ADHESIVE LAYER OF THE │
│              FOIL IS FACING UP.             │
│              (FIG 11)                   100 │
└─────────────────────────────────────────────┘
                    │
┌─────────────────────────────────────────────┐
│    APPLY A THIN COAT OF SECONDARY ADHESIVE  │
│         USING THE SUPPLIED APPLICATOR.      │
│              (FIG 11)                   102 │
└─────────────────────────────────────────────┘
                    │
┌─────────────────────────────────────────────┐
│     PLACE THE MYLAR SHEET WITH THE FOIL     │
│     DESIGN OVER THE AREA WHERE THE DESIGN   │
│                WILL BE LOCATED.             │
│              (FIG 13)                   104 │
└─────────────────────────────────────────────┘
                    │
┌─────────────────────────────────────────────┐
│  USING AN IRON SET ON LOW, 150 - 200°, PRESS ON │
│    THE MYLAR SURFACE DIRECTLY OVER THE      │
│  REMAINING FOIL FOR 2 TO 4 SECONDS, THEN RAISE │
│  THE IRON CONTINUE UNTIL THE ENTIRE DESIGN HAS │
│                 BEEN COVERED.               │
│              (FIG 13)                   106 │
└─────────────────────────────────────────────┘
                    │
┌─────────────────────────────────────────────┐
│   LET THE FOIL COOL FOR 5 TO 10 SECONDS.    │
│                                         108 │
└─────────────────────────────────────────────┘
                    │
┌─────────────────────────────────────────────┐
│    GRASP THE MYLAR AND PEEL OFF FROM THE    │
│                 FOIL DESIGN.                │
│              (FIG 14)                   110 │
└─────────────────────────────────────────────┘
```

FIG 19

PROCESS FOR APPLYING INDICIA ONTO AN ELASTOMERIC COMPONENT

BACKGROUND OF THE INVENTION

1. Field of the Invention

The instant invention relates generally to heat transfer systems and more specifically it relates to a process for applying indicia onto an elastomeric component. The process for applying indicia onto an elastomeric component will transfer by heat a coating of metallic foil onto raised surfaces on the elastomeric component. The process for applying indicia onto an elastomeric component will also transfer by heat a design of colored metallic foil onto a surface of the elastomeric component.

2. Description of the Prior Art

Numerous heat transfer systems have been provided in prior art. For example, U.S. Pat. Nos. numbered 5,364,688 to Mahn, Jr.; 5,380,391 to Mahn, Jr.; 5,437,755 to Lavorel et al. and 5,508,248 to Nagashima all are illustrative of such prior art. While these units may be suitable for the particular purpose to which they address, they would not be as suitable for the purposes of the present invention as heretofore described.

Mahn, Jr., John

HEAT ACTIVATED TRANSFER FOR ELASTOMERIC MATERIALS

U.S. Pat. No. 5,364,688

A heat activated transfer which is particularly suitable for marking elastomeric articles comprises a lower elastomeric layer bonded to an upper polyester layer. The upper polyester layer in turn carries indicia which is a sublimation dye heat transferred into the polyester layer. The polyester is preferably a high temperature saturated polyester resin, preferably polyethylene terephthalate. The lower layer is preferably a thermoplastic elastomeric layer. The two layers are bonded together by a thermoplastic adhesive, preferably a polyester.

Mahn, Jr., John

HEAT ACTIVATED TRANSFER FOR ELASTOMERIC MATERIALS

U.S. Pat. No. 5,380,391

An article and method for marking elastomeric articles, such as tires, floor mats, and the like, includes an elastomeric sheet which is marked with indicia using a solvent based ink which contrasts with the elastomeric sheet. The indicia is cured with a clear thermoset layer such as a polyurethane. This is then applied to an uncured elastomeric article and the elastomeric article is cured. The heat and the pressure of curing causes the elastomeric sheet to bond to the elastomeric article. The indicia remains discernible and is not easily marred or dulled. After curing, the transfer can be further marked by heat transferring indicia in the form of a sublimation dye through the clear polyurethane layer.

Lavorel, Pierre-Yves Grebetier, Alain

PROCESS FOR DECORATING THE TOP PORTION OF THE SKI

U.S. Pat. No. 5,437,755

A process for decorating the top portion of the ski including a step of assembling and affixing an external, thick layer of transparent plastic material onto an opaque internal layer. Prior to the assembly step, the first decoration is transferred onto the external surface of the external layer and a second internal decoration, different from the first, is transferred onto one of the surfaces connecting the internal layer with the external layer. The invention enables an economical production of varied and easily interchangeable decorations.

Nagashima, Kousaku

HEAT TRANSFER SHEET AND BASE SHEET THEREFOR

U.S. Pat. No. 5,508,248

A base sheet and a heat transfer sheet are herein provided and make it possible to cut out any arbitrary figure or design from the heat transfer sheet having a thin heat transferable layer with an automatic cutting machine. The base sheet has a first support member and a second support member peelably integrated with the first support member, while the heat transfer sheet has the foregoing base sheet and the transferable layer formed on the second support member of the base sheet optionally through a releasing layer.

SUMMARY OF THE INVENTION

A primary object of the present invention is to provide a process for applying indicia onto an elastomeric component that will overcome the shortcomings of the prior art devices.

Another object of the present invention is to provide a novel means of enhancing and individualizing the appearance of a motor vehicle.

Another object of the present invention is to provide a novel means of personalizing the appearance of motor vehicle tires by attaching unique designs created in decorative foil.

Another object of the present invention is to provide a kit that will incorporate the materials and instructions on how to personalize the tires of a motor vehicle.

Another object of the present invention is to make this process semi-permanent which would enable an individual to remove and/or change the design without affecting the structure or integrity of the motor vehicle tire.

Another object is to provide a process for applying indicia onto an elastomeric component that will transfer by heat, a coating of metallic foil onto raised surfaces on the elastomeric component, which can be letters on a motor vehicle tire.

An additional object is to provide a process for applying indicia onto an elastomeric component that will transfer by heat, a design of colored metallic foil onto a surface of the elastomeric component.

A further object is to provide a process for applying indicia onto an elastomeric component that is simple and easy to use.

A still further object is to provide a process for applying indicia onto an elastomeric component that is economical in cost to manufacture.

A still further object is to provide a process for applying indicia onto an elastomeric component that provides sharply defined edges to the color applied to the raised letters, providing the appearance that the elastomeric component was custom made.

Further objects of the invention will appear as the description proceeds.

To the accomplishment of the above and related objects, this invention may be embodied in the form illustrated in the accompanying figures, attention being called to the fact, however, that the figures are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying figures, in which like reference characters designate the same or similar parts throughout the several views, and wherein;

FIGS. 15 and 16 are block diagrams of a flow chart for the first embodiment.

FIGS. 17, 18 and 19 are block diagrams of a flow chart for the second embodiment.

Similar reference characters denote corresponding features consistently throughout the attached figures.

DETAILED DESCRIPTION OF THE PREFERRED EMBODIMENTS

Figure 1:
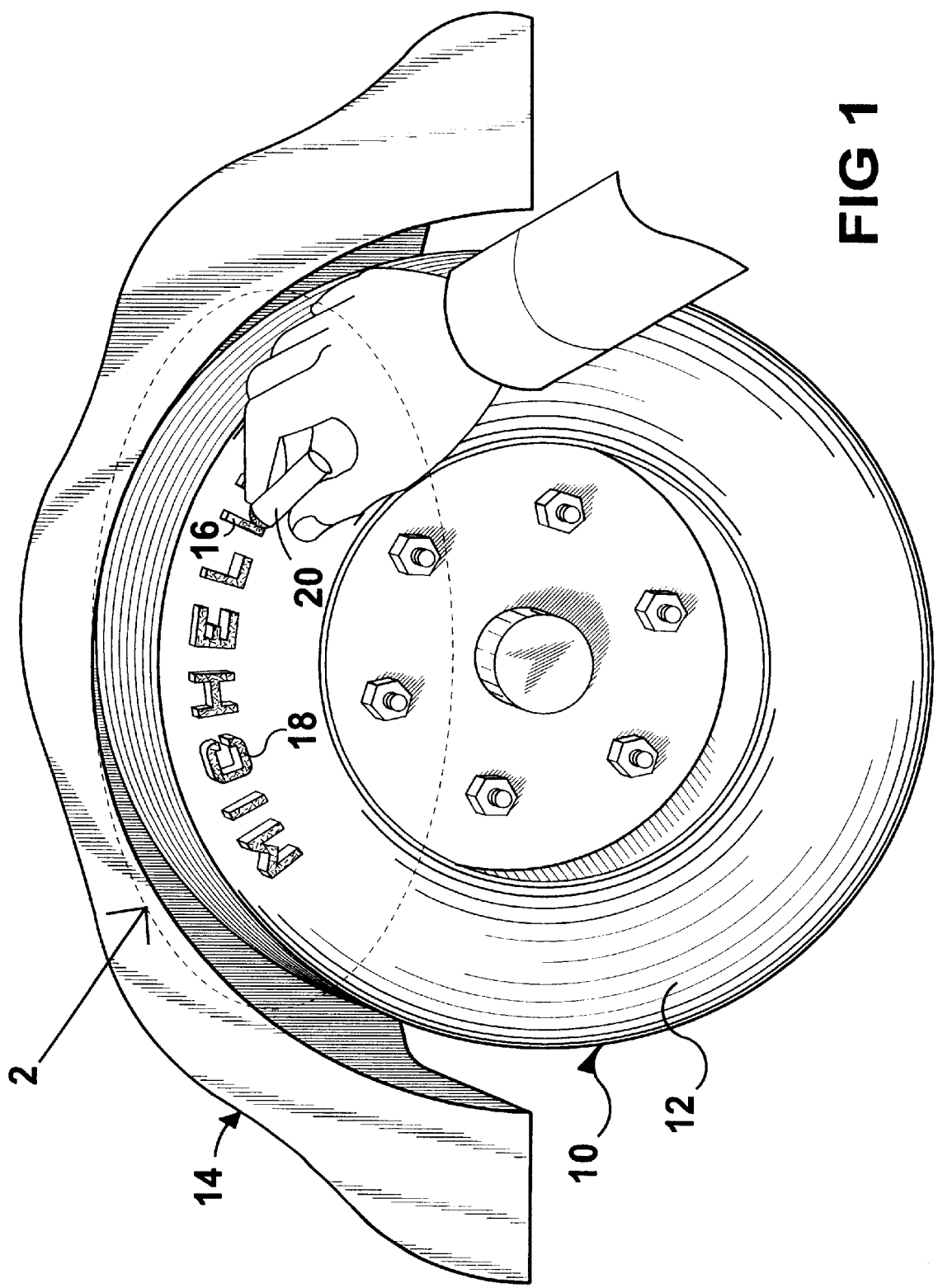
FIG. 1 is a perspective view showing a second step of a first embodiment of the instant invention.

Turning now descriptively to the figures, in which similar reference characters denote similar elements throughout the several views. A first embodiment of the invention consists of a process for applying indicia onto an elastomeric component 10, such as a tire 12 of a motor vehicle 14, comprising the steps of:

1. Cleaning raised surfaces 16, such as letters, of the elastomeric component 10 with a degreaser and solvent.

Figure 2:
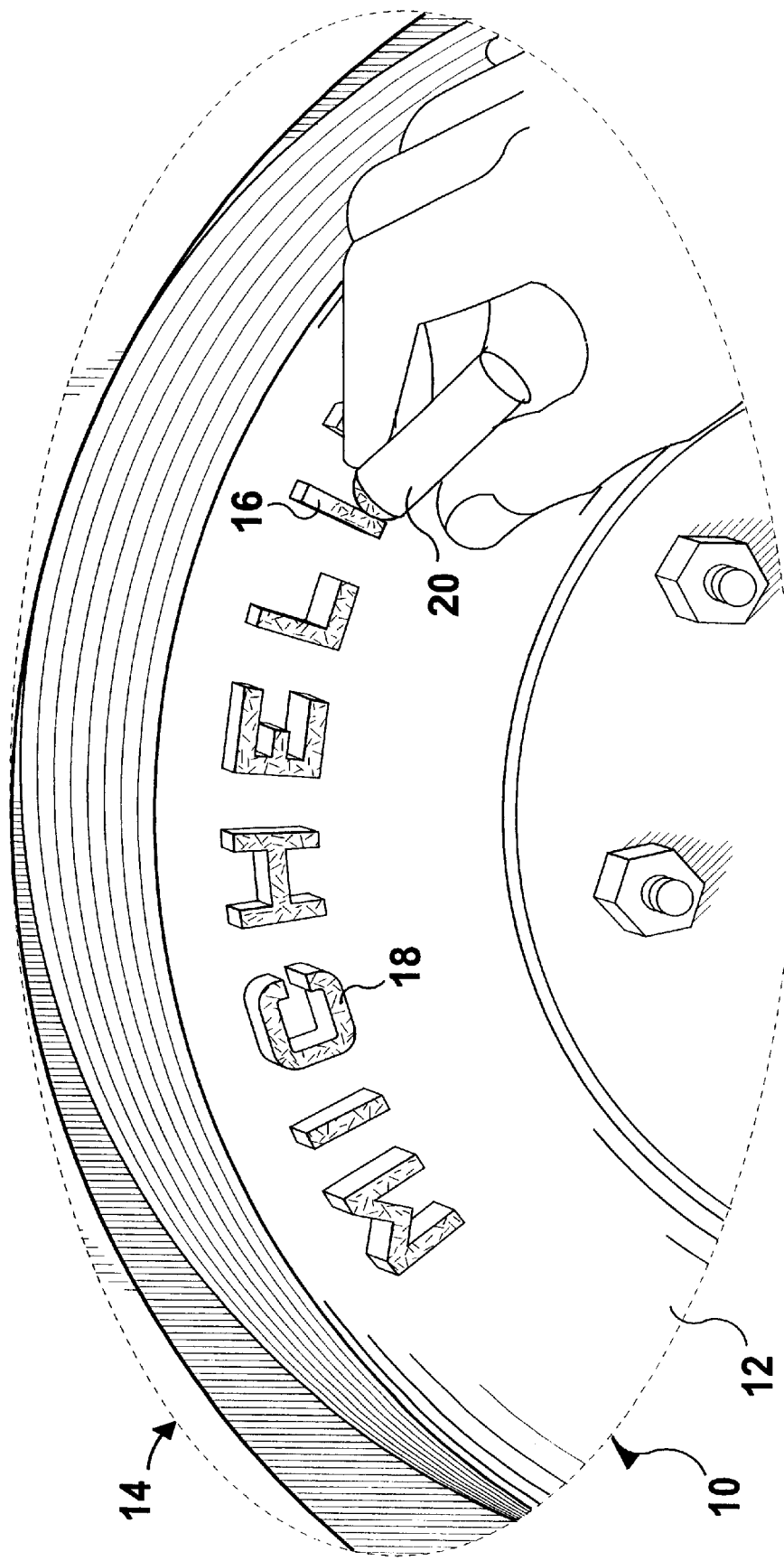
FIG. 2 is an enlarged perspective view of an area indicated by arrow 2 in FIG. 1.

2. Applying a thin coat of a primary adhesive 18 with a supplied applicator 20 to the raised surfaces 16, as in FIGS. 1 and 2. FIG. 2 is an enlarged view of taken from within the circle labeled 2 in FIG. 1.

3. Letting the primary adhesive 18 on the raised surfaces 16 cure.

Figure 3:
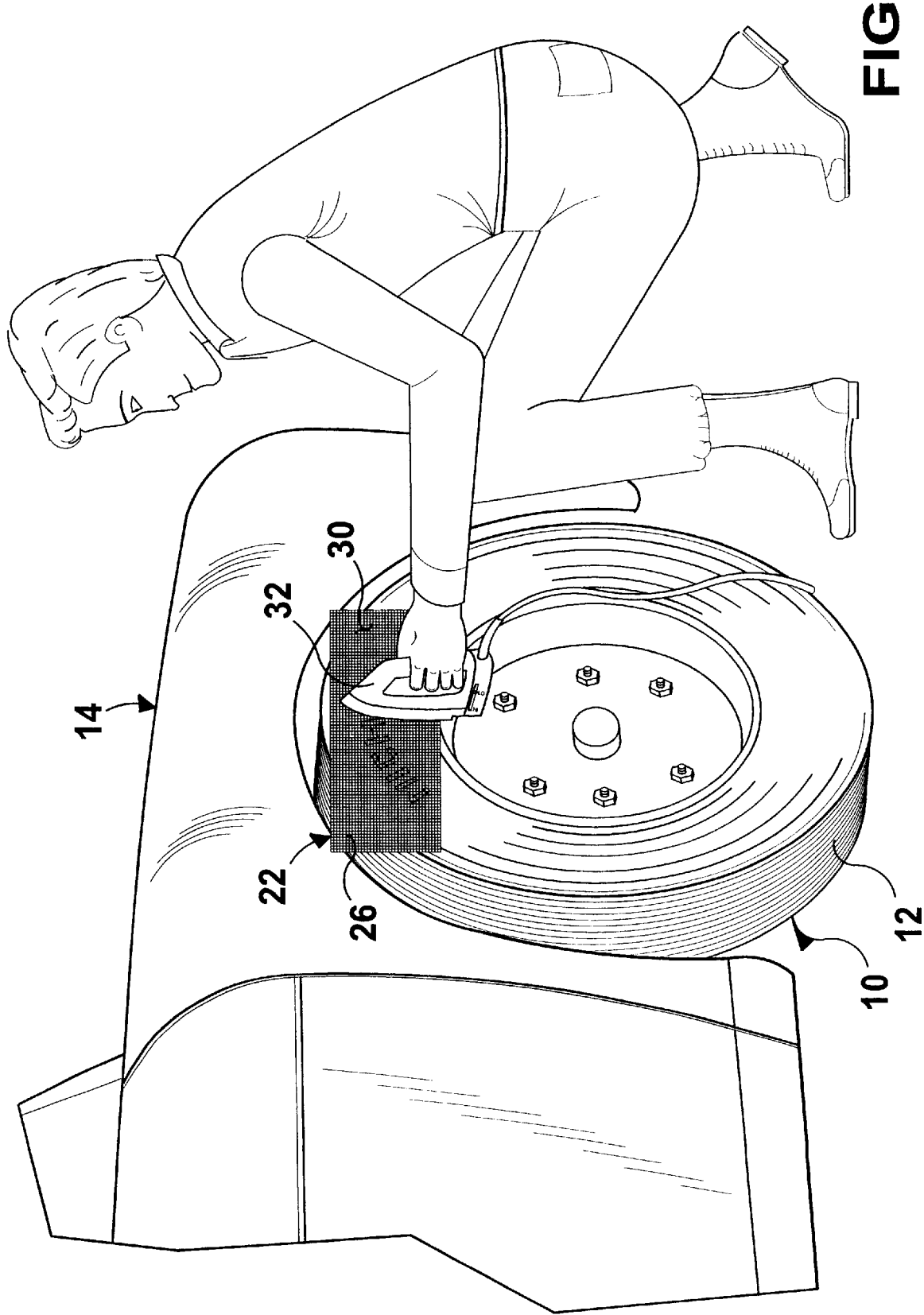
FIG. 3 is a perspective view showing a fifth step of the first embodiment.
Figure 9:
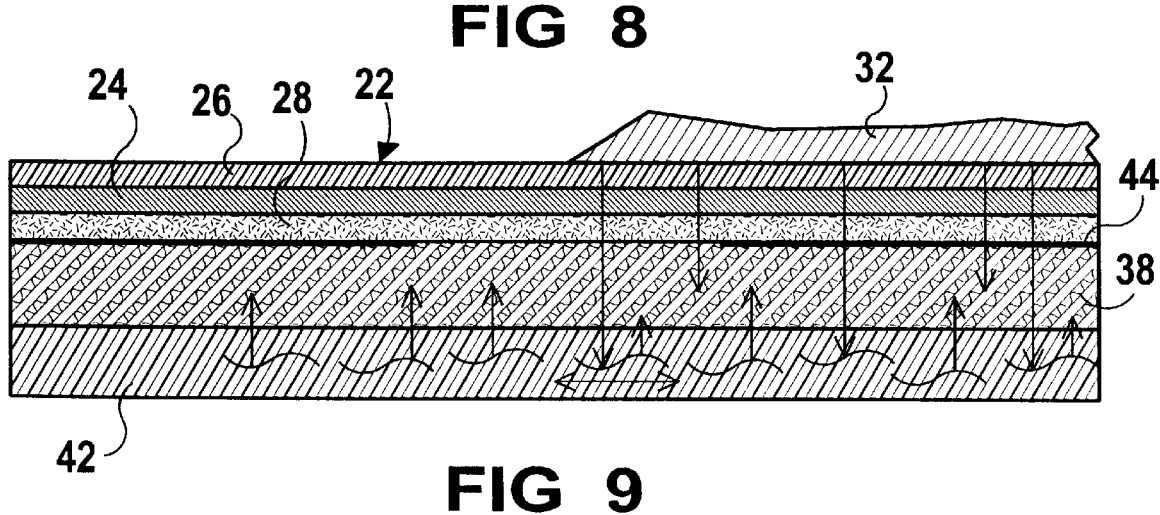
FIG. 9 is an enlarged cross sectional view taken along line 9—9 in FIG. 8.

4. Providing a foil sheet 22, which is a composition of a thin metallic foil layer 24, contained between a Mylar layer 26 and an adhesive layer 28, as in FIG. 9. The adhesive layer 28 can be put against the raised surfaces 16, as in FIG. 3.

5. Pressing on an outer surface 30 of the mylar layer 26 with an iron 32 set on low heat (one hundred and fifty degrees to two hundred degrees Fahrenheit), until the letters are visible in the thin metallic foil layer 24, to indicate that the adhesive layer 28 has bonded with the primary adhesive 18 on the raised surfaces 16, as in FIG. 3.

6. Removing the iron to let the applied foil sheet 22 on the raised surfaces 16 to cool for ten to twenty seconds.

Figure 4:
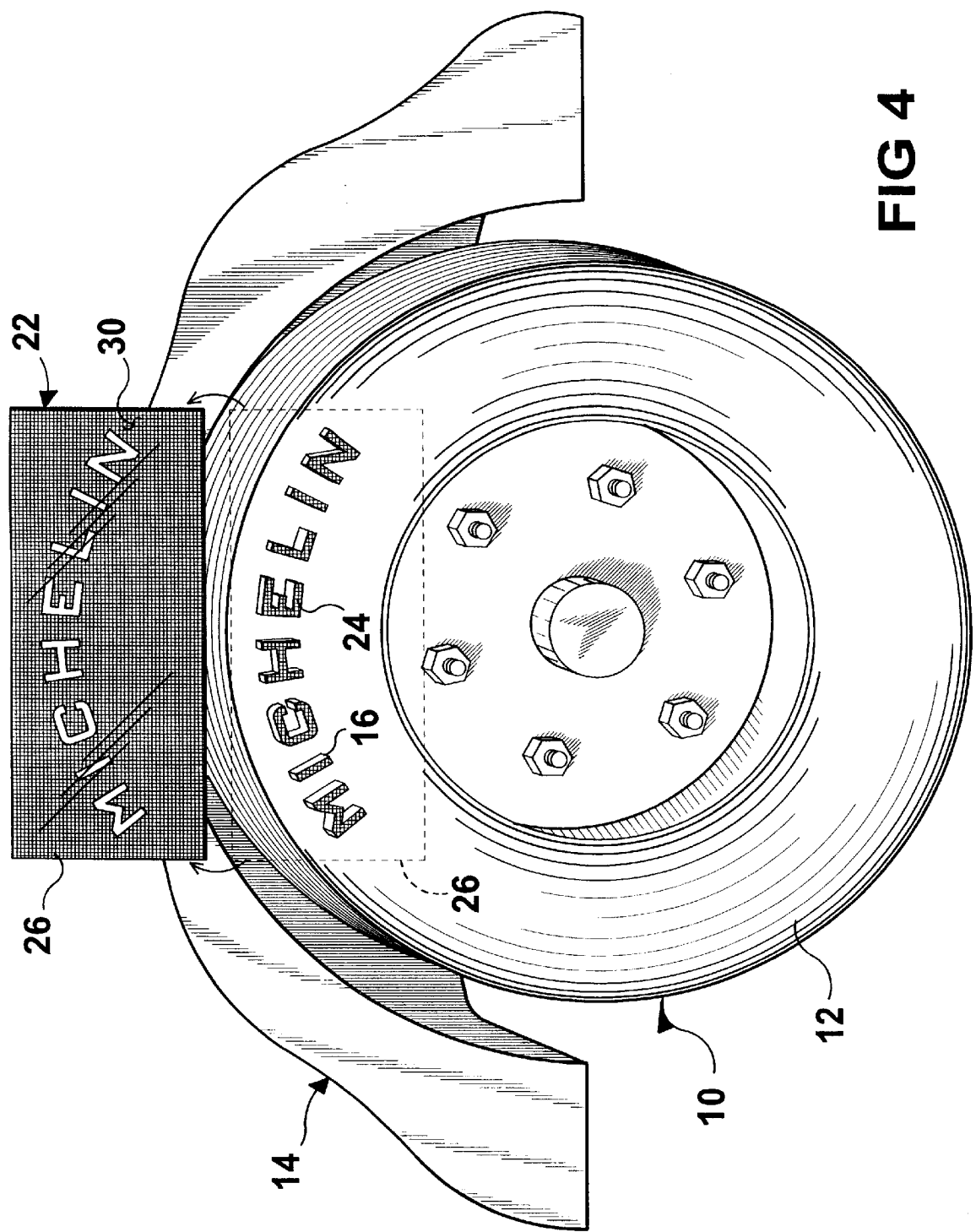
FIG. 4 is a perspective view showing a seventh step of the first embodiment.

7. Grasping the applied foil sheet 22 by an unattached corner and gently peel it off from the raised surfaces 16, as in FIG. 4.

8. To apply additional layers of foil 24, repeating the process of coating the raised surfaces 16 with adhesive 18 and then heat press on foil 24.

9. To apply additional layers of the foil 24, coat the back of the foil sheet 22 with adhesive 18, letting dry and then heat press on foil 24.

Figure 5:
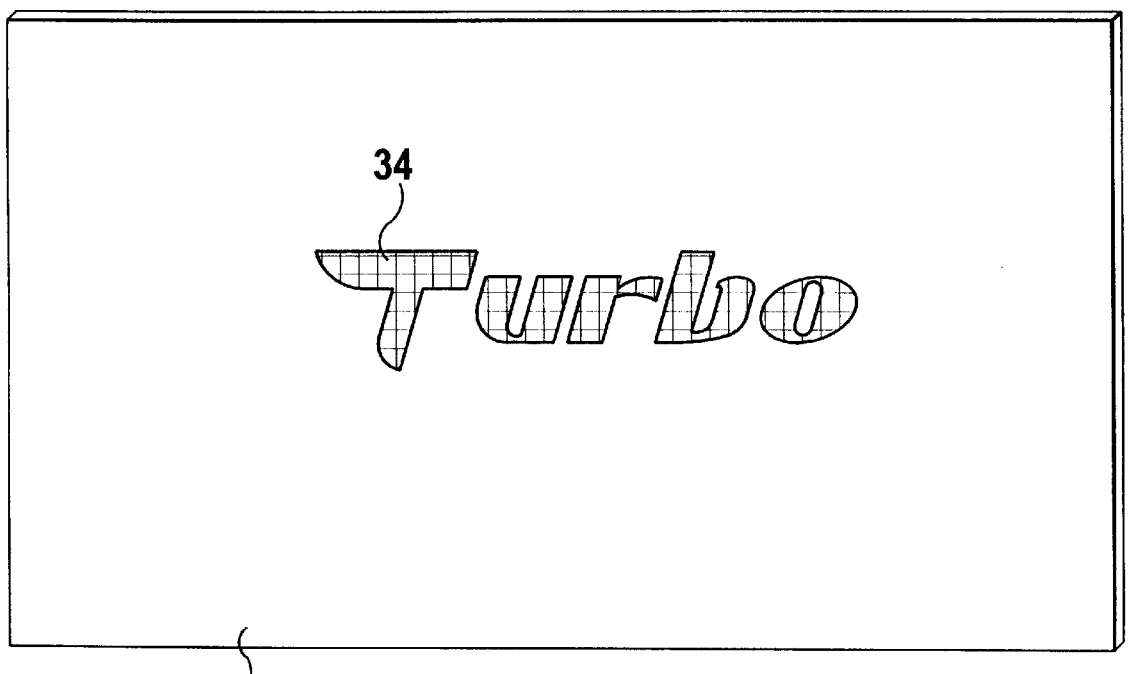
FIG. 5 is a perspective view showing a plain piece of white paper with a design thereon as a first step of a second embodiment of the instant invention.

A second embodiment of the invention also consists of a process for applying indicia onto the elastomeric component 10, comprising the steps of:

1. Supplying a design 34 being any name, photograph, picture and drawing that is reproduced onto a piece of plain white paper 36, as in FIG. 5.

Figure 6:
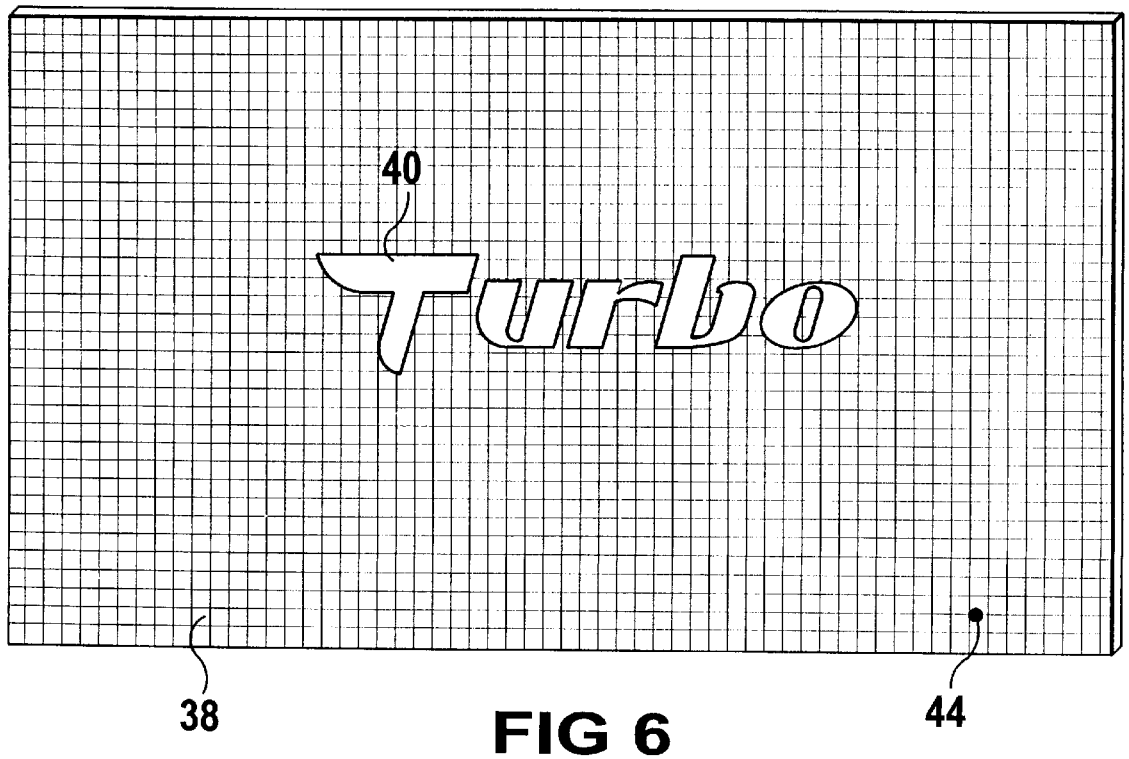
FIG. 6 is a perspective view showing a black and white xerographic copy with an inverse design thereon as a second step of the second embodiment.

2. Producing a black and white xerographic copy 38 of the inverse design 40, as in FIG. 6.

3. Placing on a suitable work space, some old newspapers or any materials which will provide a flat stable surface and be unaffected by the low temperature iron 32.

Figure 7:
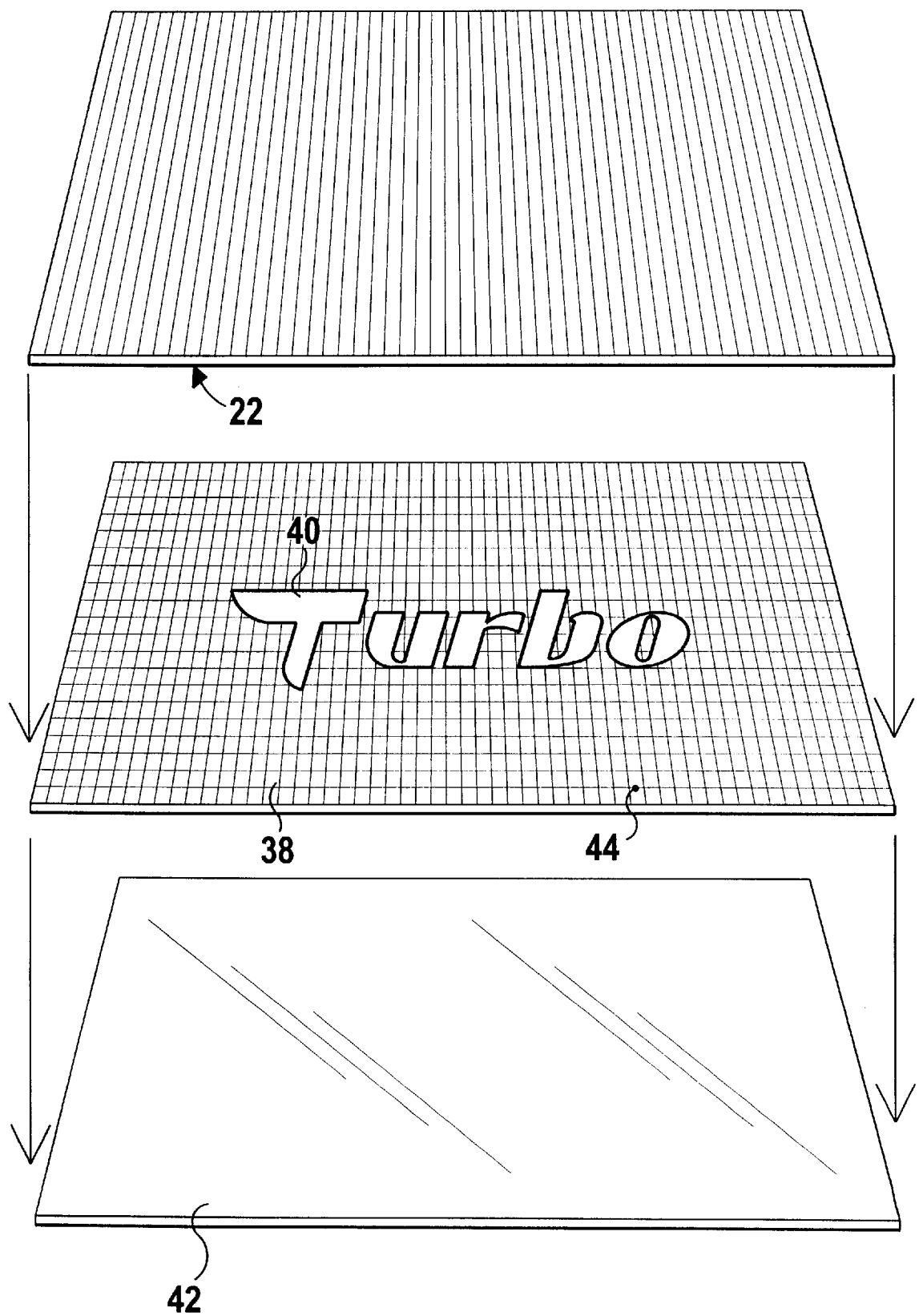
FIG. 7 is an exploded perspective view showing a fourth, fifth and sixth step of the second embodiment.

4. Placing a supplied acetate sheet 42 on the work space, as in FIG. 7.

5. Placing the inverse design 40 on the black and white xerographic copy 38 on top of the acetate sheet 42, as in FIG. 7.

6. Placing a selected color foil sheet 22, with its shiny side up on top of the inverse design 40 on the black and white xerographic copy 38, as in FIG. 7. The selected color foil sheet 22 is a composition of the thin metallic foil layer 24 contained between the Mylar layer 26 and the adhesive layer 28, as in FIG. 9.

7. Putting the iron 32 set on low heat (one hundred and fifty degrees to two hundred degrees Fahrenheit) on top of the Mylar layer 26 and pass over the entire design in a smooth and consistent manner for approximately fifteen to thirty seconds depending on the complexity and amount of detail contained on the inverse design 40. A fine detail design would require the longer time period to ensure proper bonding between the xerographic toner ink 44 of the design and the adhesive layer 28 of the foil sheet 22, as in FIG. 8.

8. Using the acetate sheet 42 as an underlayment to allow an easier, better bonding of the foil layer 24 to the xerographic toner ink 44. The acetate sheet 42 acts as a heat reflector for consistent even heat on the design, so that with the application of heat, the adhesive layer 44 of the foil sheet 22 will bond to the xerographic toner ink 44 of the design, while the foil 24 will not bond to the paper 38, but only to the xerographic toner ink 44 on the paper 38, as in FIG. 9.

Figure 10:
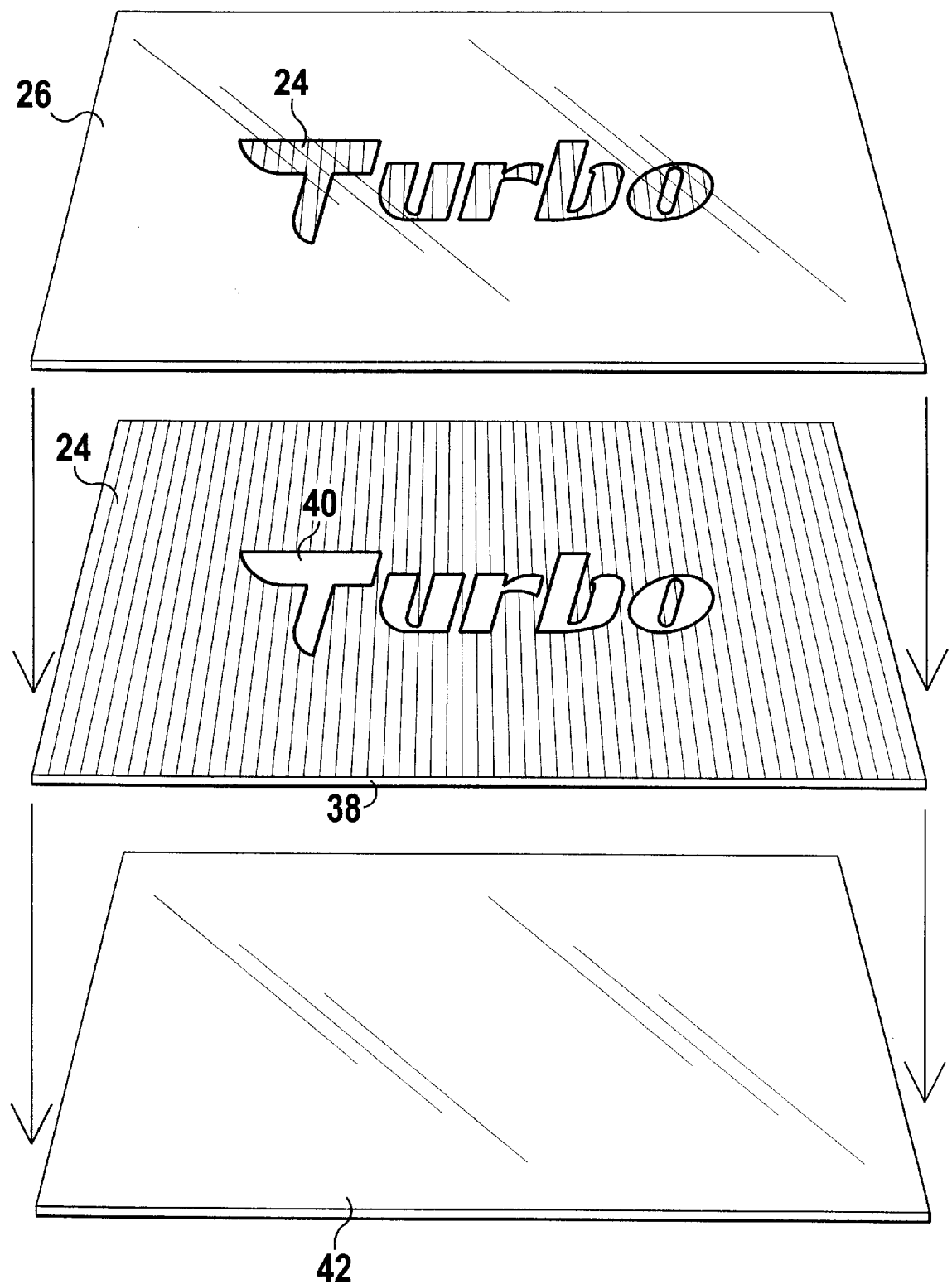
FIG. 10 is an exploded perspective view showing a ninth step of the second embodiment.
Figure 11:
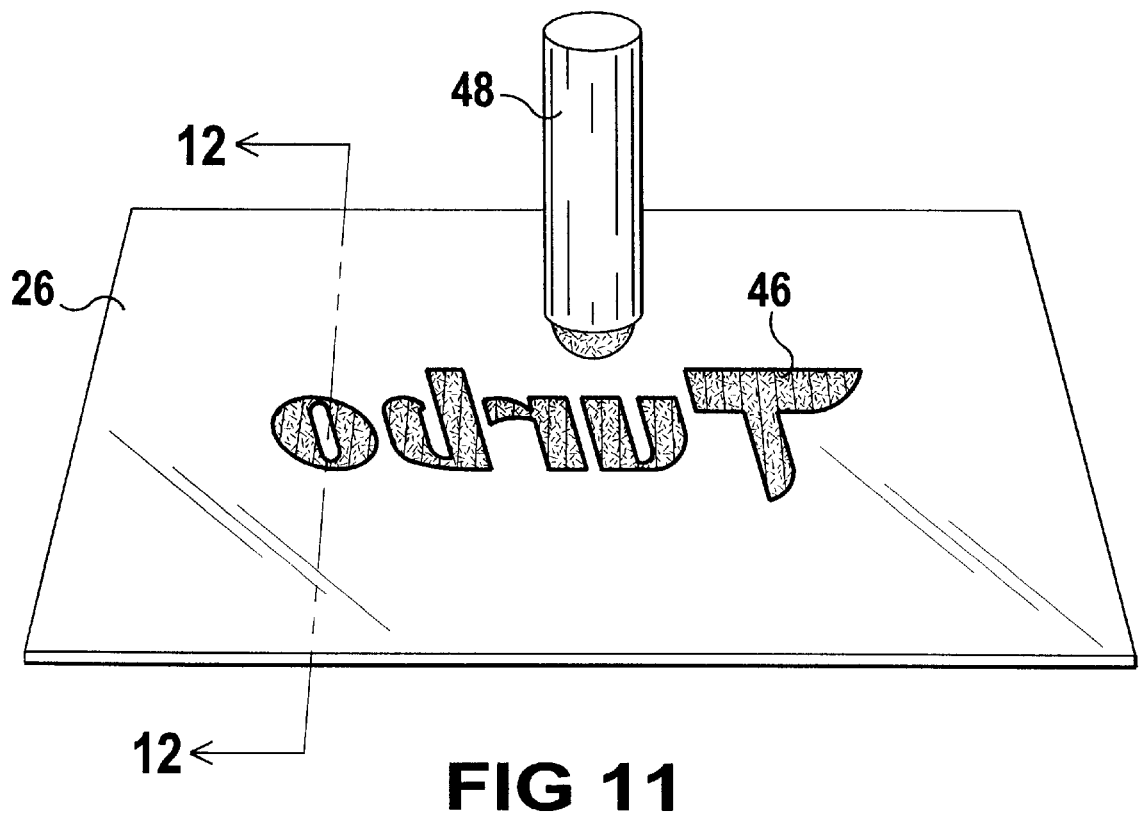
FIG. 11 is a perspective view of a tenth and eleventh step of the second embodiment.
Figure 12:
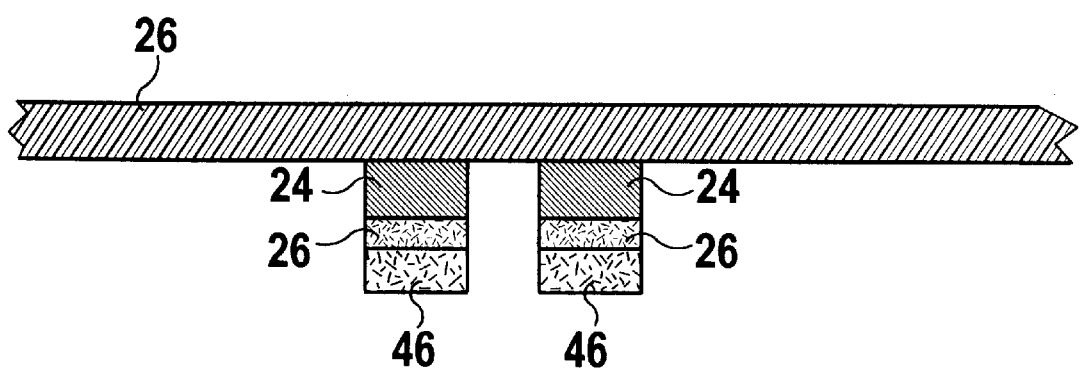
FIG. 12 is an enlarged inverted cross sectional view taken along line 12—12 in FIG. 11.
Figure 13:
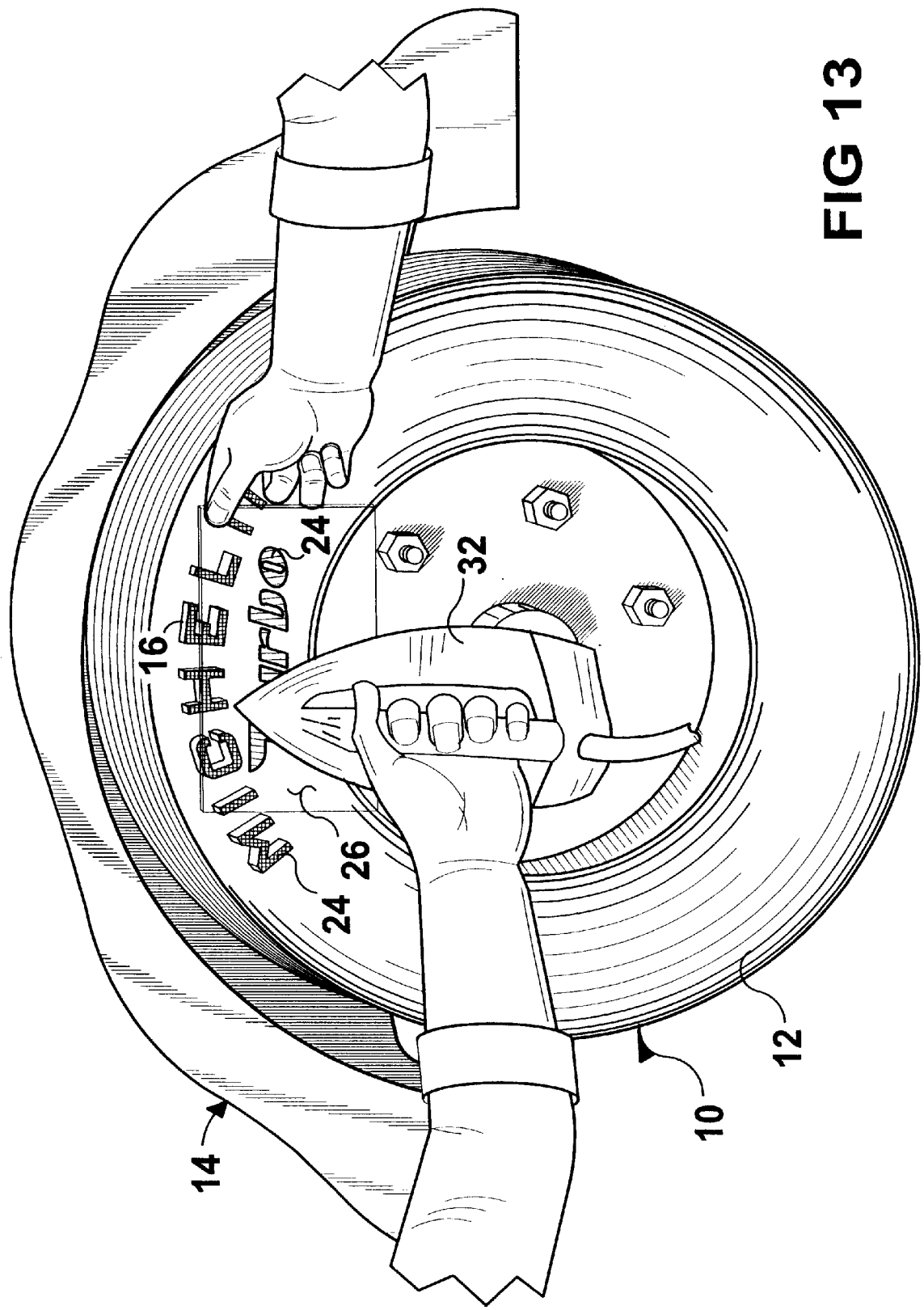
FIG. 13 is a perspective view of a thirteenth step of the second embodiment.
Figure 14:
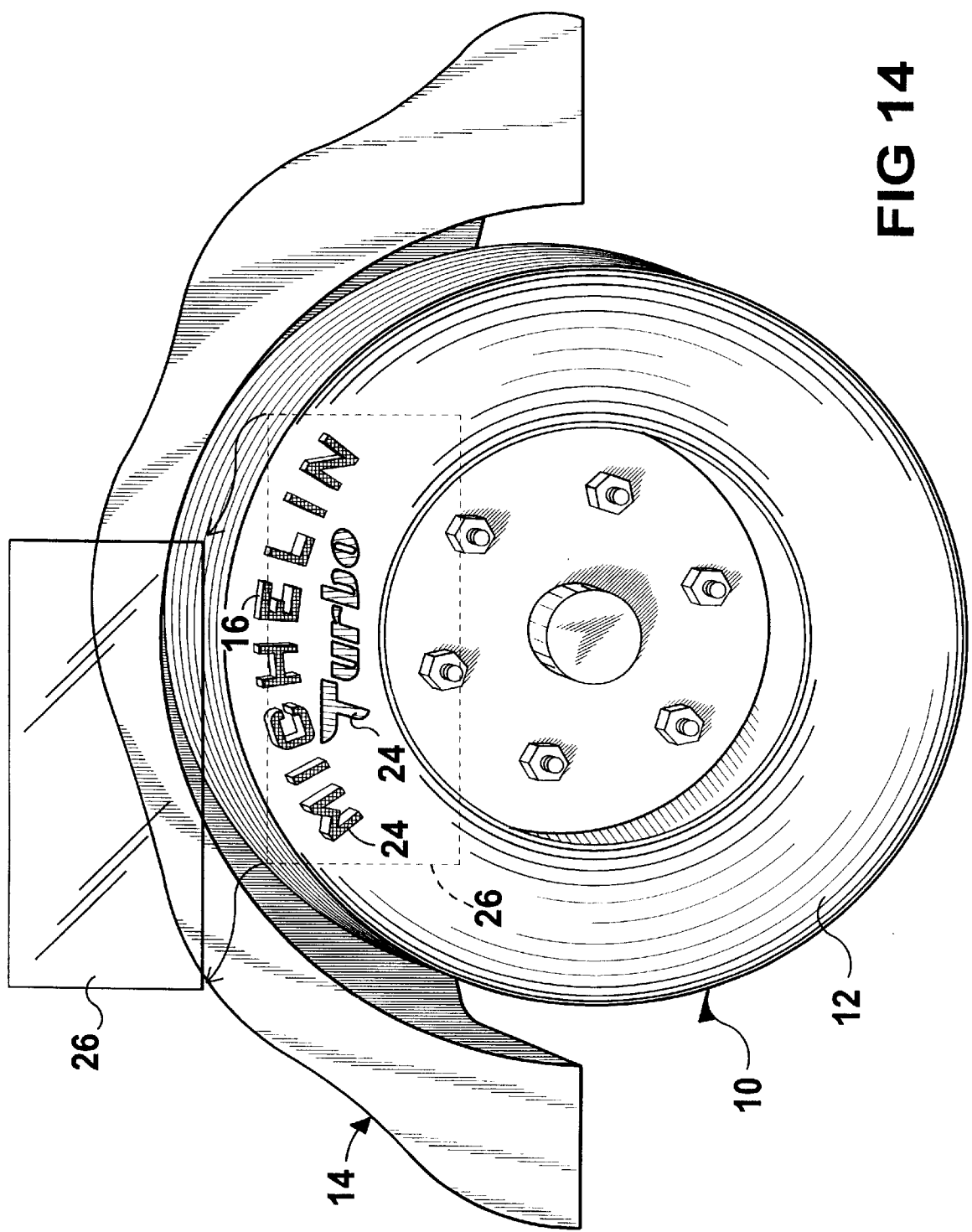
FIG. 14 is a perspective view of a fifteenth step of the second embodiment.

9. Letting the foil 24 cool for five to ten seconds.
10. Grasping the foil sheet 24 and peel off from the paper 38 containing the inverse design 40. The results are that the adhesive 28 and foil 24, still attached to the Mylar layer 26, is an exact copy of the design 34 which was used to make the inverse design 40 on the black and white xerographic copy 38, as in FIG. 10.
11. Turning over the Mylar layer 26 with the attached foil design, so that the adhesive layer 26 of the foil sheet 22 is facing up, as in FIG. 11.
12. Applying a thin coat of a secondary adhesive 46 using a supplied applicator 48 onto the adhesive layer 26 on the foil design, as in FIGS. 11 and 12, or applying adhesive directly to the elastomeric component where the design is to be located.
13. Placing the Mylar layer 26 with the foil design over an area on the elastomeric component 10, where the design will be located, as in FIG. 13.
14. Pressing the iron 32 set on low heat (one hundred fifty degrees to two hundred degrees Fahrenheit) on the Mylar layer 26 directly over the remaining foil layer 24 for two to four seconds, then raise the iron 32 and continue until the entire design has been covered, as in FIG. 13.
15. Letting the foil sheet 24 to cool for five to ten seconds.
16. Grasping the Mylar layer 26 and peel off from the foil design 24, as in FIG. 14.

A first block diagram flow chart 50 is shown in FIGS. 15 and 16, for the first embodiment. First box 52 corresponds with the first step. Second box 54 corresponds with the second step and FIGS. 1 and 2. Third box 56 corresponds with the third step. Fourth box 58 corresponds with the fourth step and FIG. 9. Fifth box 60 corresponds with the fifth step and FIG. 3. Sixth box 62 corresponds with the sixth step. Seventh box 64 corresponds with the seventh step and FIG. 4. Eighth box 66 corresponds with the eighth and ninth steps.

A second block diagram flow chart 68 is shown in FIGS. 17 to 19, for the second embodiment. First box 70 corresponds with the first step and FIG. 5. Second box 72 corresponds with the first step and FIG. 5. Third box 74 corresponds with the second step and FIG. 6. Fourth box 76 corresponds with the third step. Fifth box 78 corresponds with the fourth step and FIG. 7. Sixth box 80 corresponds with the fifth step and FIG. 7. Seventh box 82 corresponds with the sixth step and FIG. 7.

Figure 8:
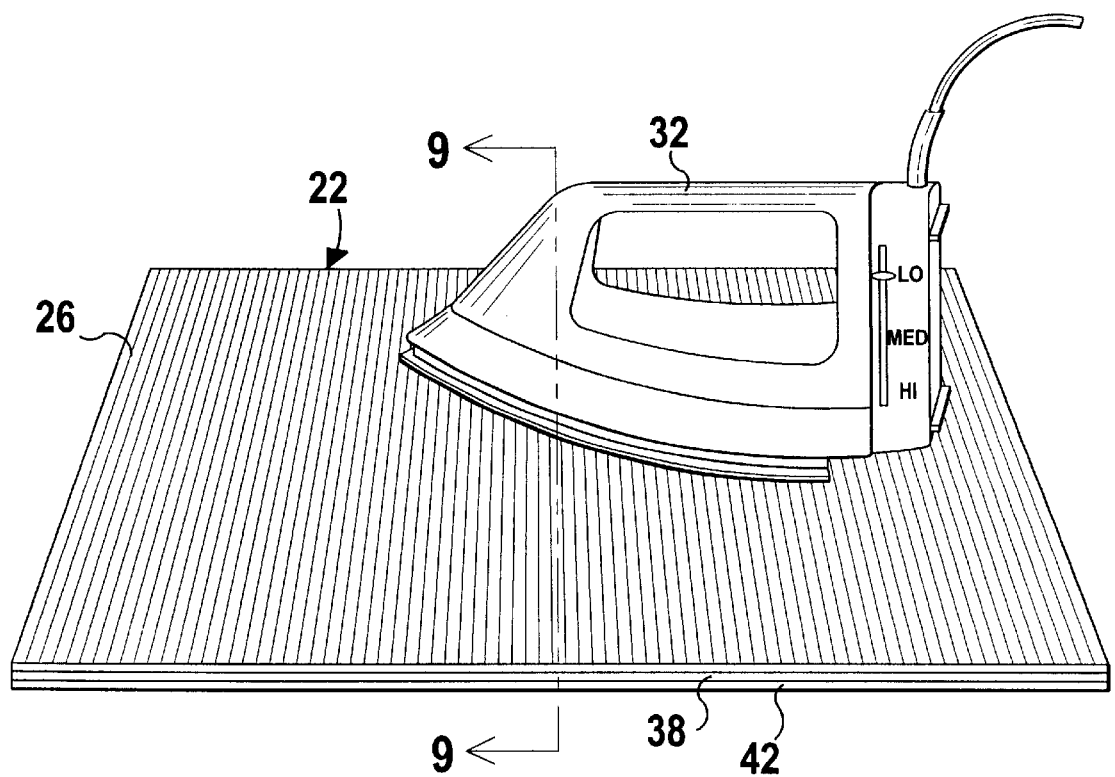
FIG. 8 is a perspective view showing a seventh step of the second embodiment.

Eighth box 84 corresponds with the seventh step and FIG. 8. Ninth box 86 corresponds with the seventh step. Tenth box 88 corresponds with the eighth step and FIG. 9. Eleventh box 90 corresponds with the sixth step and FIG. 9. Twelfth box 92 corresponds with the eighth step and FIG. 9. Thirteenth box 94 corresponds with the tenth step and FIG. 10.

Fourteenth box 96 corresponds with the ninth step. Fifteenth box 98 corresponds with the tenth step and FIG. 10. Sixteenth box 100 corresponds with the eleventh step and FIG. 11. Seventeenth box 102 corresponds with the twelfth step and FIGS. 11 and 12. Eighteenth box 104 corresponds with the thirteenth step and FIG. 13. Nineteenth box 106 corresponds with the fourteenth step and FIG. 13. Twentieth box 108 corresponds with the fifteenth step. Twenty first box 110 corresponds with the sixteenth step and FIG. 14.

LIST OF REFERENCE NUMBERS

10 elastomeric component
12 tire for 10 of 14
14 motor vehicle
16 raised surfaces of 10
18 primary adhesive on 16
20 applicator for 18
22 foil sheet
24 thin metallic foil layer of 22
26 Mylar layer of 22
28 adhesive layer of 22
30 outer surface of 26
32 iron
34 design on 36
36 piece of plain white paper
38 black and white xerographic copy
40 inverse design on 38
42 acetate sheet
44 xerographic toner ink on 38
46 secondary adhesive
48 applicator for 46
50 first block diagram flow chart
52 first box of 50
54 second box of 50
56 third box of 50
58 fourth box of 50
60 fifth box of 50
62 sixth box of 50
64 seventh box of 50
66 eighth box of 50
68 second block diagram flow chart
70 first box of 68
72 second box of 68
74 third box of 68
76 fourth box of 68
78 fifth box of 68
80 sixth box of 68
82 seventh box of 68
84 eighth box of 68
86 ninth box of 68
88 tenth box of 68
90 eleventh box of 68
92 twelfth box of 68
94 thirteenth box of 68
96 fourteenth box of 68
98 fifteenth box of 68
100 sixteenth box of 68
102 seventeenth box of 68
104 eighteenth box of 68
106 nineteenth box of 68
108 twentieth box of 68
110 twenty first box of 68

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A process for applying indicia onto an elastomeric component, comprising the steps of:
    a) cleaning raised surfaces of the elastomeric component with a degreaser and solvent;
    b) applying a thin coat of a primary adhesive with a supplied applicator to the raised surfaces;
    c) letting the primary adhesive on the raised surfaces cure;
    d) providing a foil sheet which is a composition of a thin metallic foil layer contained between a first layer and an adhesive layer, so that the adhesive layer can be put against the raised surfaces;
    e) pressing on an outer surface of the first layer with an iron operating at a temperature of one hundred and fifty degrees to two hundred degrees Fahrenheit, until the raised surfaces are visible in the thin metallic foil layer, to indicate that the adhesive layer has bonded with the primary adhesive on the raised surfaces;
    f) removing the iron to let the applied foil sheet on the raised surfaces cool for ten to twenty seconds; and
    g) grasping the applied foil sheet by an unattached corner and gently peel it off from the raised surfaces.

2. The process as recited in claim 1, wherein to apply additional layers of foil, repeating said process of coating the raised surfaces with adhesive and then heat press on foil.

3. The process as recited in claim 1, wherein to apply additional layers of the foil, coat the back of the foil sheet with adhesive, letting dry and then heat press on foil.

4. A process for applying indicia onto an elastomeric component, comprising the steps of:
    a) cleaning raised surfaces of the elastomeric component with a degreaser and solvent;
    b) applying a thin coat of a primary adhesive with a supplied applicator to the raised surfaces;
    c) letting the primary adhesive on the raised surfaces cure;
    d) providing a foil sheet which is a composition of a thin metallic foil layer contained between a first layer and an adhesive layer, so that the adhesive layer can be put against the raised surfaces;
    e) pressing on an outer surface of the first layer with an iron operating at a temperature of one hundred and fifty degrees to two hundred degrees Fahrenheit, until the raised surfaces are visible in the thin metallic foil layer, to indicate that the adhesive layer has bonded with the primary adhesive on the raised surfaces;
    f) removing the iron to let the applied foil sheet on the raised surfaces cool for ten to twenty seconds;
    g) grasping the applied foil sheet by an unattached corner and gently peel it off from the raised surfaces;
    h) apply additional layers of foil, repeating said process of coating the raised surfaces with adhesive and then heat press on foil; and
    i) apply additional layers of the foil, coating the back of the foil sheet with adhesive, letting dry and then heat press on foil.

* * * * *